(12) United States Patent
Jia

(10) Patent No.: US 9,665,364 B2
(45) Date of Patent: May 30, 2017

(54) DUAL-BANK TELECOMMUNICATION APPARATUS AND METHOD OF UPGRADING FIRMWARE IN DUAL-BANK TELECOMMUNICATION APPARATUS

(71) Applicant: THOMSON LICENSING, Issy les Moulineaux (FR)

(72) Inventor: Keyong Jia, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/899,609

(22) PCT Filed: Jun. 18, 2013

(86) PCT No.: PCT/CN2013/077424
§ 371 (c)(1),
(2) Date: Dec. 18, 2015

(87) PCT Pub. No.: WO2014/201625
PCT Pub. Date: Dec. 24, 2014

(65) Prior Publication Data
US 2016/0224331 A1 Aug. 4, 2016

(51) Int. Cl.
*G06F 9/44* (2006.01)
*G06F 9/445* (2006.01)
*H04L 29/08* (2006.01)

(52) U.S. Cl.
CPC .............. *G06F 8/65* (2013.01); *G06F 8/665* (2013.01); *H04L 67/02* (2013.01); *H04L 67/06* (2013.01)

(58) Field of Classification Search
CPC ....................................................... G06F 8/65
See application file for complete search history.

(56) References Cited

U.S. PATENT DOCUMENTS

| 5,452,339 | A | 9/1995 | Siu et al. |
| 7,392,518 | B1 | 6/2008 | Chhabra |

(Continued)

FOREIGN PATENT DOCUMENTS

| CN | 101931942 | 12/2010 |
| CN | 102681871 | 9/2012 |

(Continued)

OTHER PUBLICATIONS

"Dual-bank and single-bank updates", Mar. 6, 2015, retrieved from https://developer.nordicsemi.com/nRF5_SDK/nRF51_SDK_v8.x.x/doc/8.0.0/s110/html/a00088.html on Sep. 16, 2016.*

(Continued)

*Primary Examiner* — Philip Wang
(74) *Attorney, Agent, or Firm* — Myers Wolin, LLC

(57) ABSTRACT

A method of upgrading firmware in a dual-bank telecommunication apparatus which includes first and second flash banks each configured to store a firmware image includes receiving, by the dual-bank telecommunication apparatus, an upgrade command from a server to download a new firmware image; deleting, by the dual-bank telecommunication apparatus, the firmware image from the first bank in response to the upgrade command, and downloading and writing the new firmware image into the first bank; and loading, by the dual-bank telecommunication apparatus, the new firmware image from the first bank, when a switchover command is received from the server.

7 Claims, 5 Drawing Sheets

(56) References Cited

U.S. PATENT DOCUMENTS

| | | | |
|---|---|---|---|
| 8,250,567 B2* | 8/2012 | Gesquiere | G06F 8/65 713/1 |
| 2008/0040713 A1* | 2/2008 | Subbakrishna | G06F 8/65 717/173 |
| 2009/0222497 A1 | 9/2009 | Ryan | |
| 2011/0041003 A1* | 2/2011 | Pattar | H04W 12/10 714/4.3 |
| 2012/0258659 A1 | 10/2012 | Emmons | |
| 2013/0246706 A1* | 9/2013 | Matsumura | G06F 8/65 711/114 |
| 2014/0281465 A1* | 9/2014 | Catherwood | G06F 9/4401 713/2 |

FOREIGN PATENT DOCUMENTS

| | | |
|---|---|---|
| KR | 872180 | 12/2008 |
| KR | 1041292 B1 | 6/2011 |

OTHER PUBLICATIONS

"TR-069 CPE WAN Management Protocol", Issue: 1 Amendment 5, Broadband Forum Technial Report, Nov. 2013.*
Search Report Dated Mar. 13, 2014.
Extended European search report with supplementary European search report and the European search opinion issued by the European Patent Office for corresponding European Patent Application No. 13887255.1, mailed on Jan. 13, 2017.

* cited by examiner

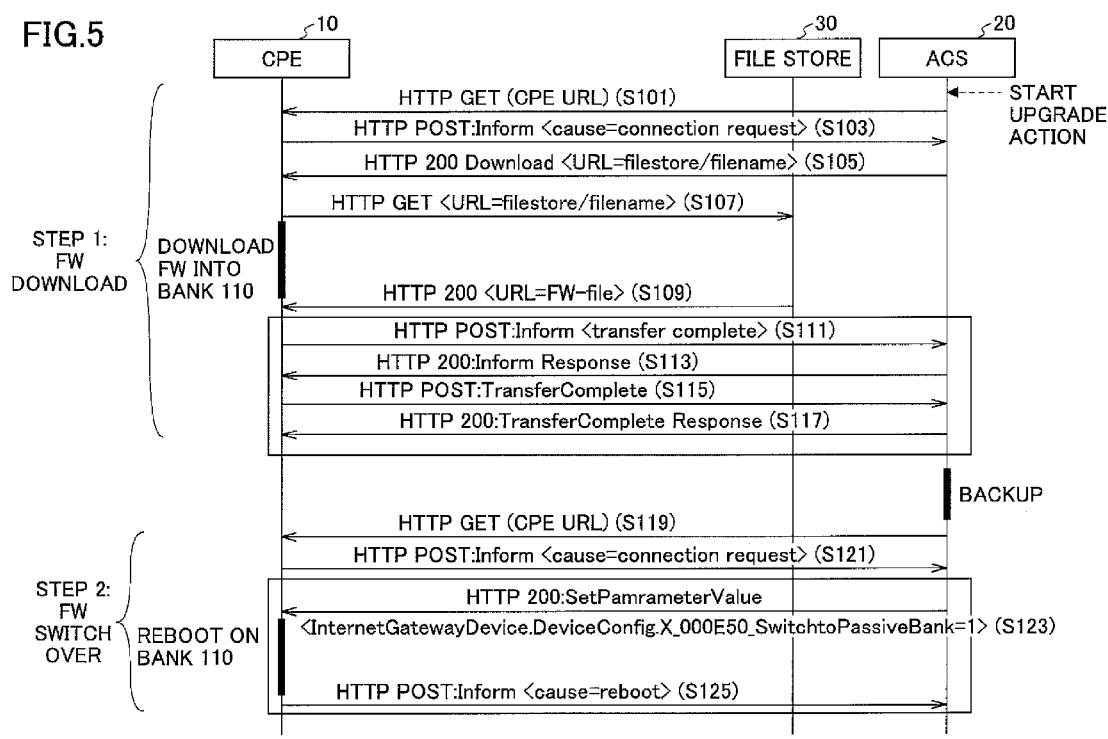

DUAL-BANK TELECOMMUNICATION APPARATUS AND METHOD OF UPGRADING FIRMWARE IN DUAL-BANK TELECOMMUNICATION APPARATUS

This application claims the benefit, under 35 U.S.C. §365 of International Application PCT/CN2013/077424, filed Jun. 18, 2013, which was published in accordance with PCT Article 21(2) on Dec. 24, 2014 in English.

FIELD OF THE INVENTION

The present disclosure relates generally to a dual-bank telecommunication apparatus and a method of upgrading firmware in a dual-bank telecommunication apparatus.

BACKGROUND OF THE INVENTION

CWMP (CPE WAN Management Protocol) is developed in Broadband Forum to remotely manage CPE (Customer Premises Equipment) such as DSL (Digital Subscriber Line) modems and broadband routers. In CWMP, an ACS (Auto Configuration Server) is used to perform an auto-configuration of CPE. For example, when new firmware is released, the ACS notifies the CPE to upgrade the firmware.

FIG. 1 shows a conceptual diagram of upgrading firmware in CPE. CPE typically has two flash banks: an active bank and a passive bank. Each flash bank has a standalone OS (Operating System) and one or more applications. The CPE can boot from any bank. The active bank is a flash bank from which the CPE reboots. The passive bank is a standby flash bank.

In FIG. 1, it is assumed that the existing firmware (FIRMWARE1) is to be upgraded to new firmware (FIRMWARE3). When the new firmware (FIRMWARE3) is released, the CPE (also referred to as a "CWMP client") receives a Firmware Image Download RPC (Remote Procedure Call) from the ACS (STEP S1), as an upgrade command to download a new firmware image (IMG3) corresponding to the new firmware (FIRMWARE3).

Upon receiving the Firmware Image Download RPC, the upgrade daemon of the CPE deletes the old firmware image (IMG2) from the passive bank (STEP S2). It should be noted that a common portion (IMG1) between the existing firmware (FIRMWARE1) and the new firmware (FIRMWARE3) may not be upgraded.

Then, the upgrade daemon downloads the new firmware image (IMG3) and writes the downloaded image (IMG3) into the passive bank (STEP S3).

When flashing is completed, switchover is performed to make the new firmware (FIRMWARE3) active (STEP S4). Specifically, a partition table in the CPE is updated to accomplish switchover between the active bank and the passive bank and a reboot is initiated by the upgrade daemon to load the new firmware image (IMG3) and any other firmware image (IMG1) into a RAM (Random Access Memory) such as an SDRAM (Synchronous Dynamic RAM) and run the new firmware (FIRMWARE3) from the RAM.

The completion (success or failure) of the firmware upgrade is indicated to the ACS by means of a TransferComplete message (STEP S5).

According to the procedures of upgrading firmware in CPE shown in FIG. 1, some services may be interrupted or stopped because of rebooting. In addition, the configurations of the current bank may be lost after switchover. Furthermore, applying the current bank configurations to the new firmware has a risk of causing the CPE to work abnormally, even causing a crash. From the viewpoint of the ACS, the ACS gets the TransferComplete message after a long time.

In view of the problems in the procedures of upgrading firmware in CPE, it is a general object of the present invention to reduce the risk of causing the CPE to work abnormally upon firmware upgrade.

SUMMARY OF THE INVENTION

In one aspect of the present invention, there is provided a method of upgrading a firmware image in a dual-bank telecommunication apparatus which includes first and second flash banks each configured to store a firmware image, including the steps of: receiving, by the dual-bank telecommunication apparatus, an upgrade command from a server to download a new firmware image; deleting, by the dual-bank telecommunication apparatus, the firmware image from the first bank in response to the upgrade command, and downloading and writing the new firmware image into the first bank; and loading, by the dual-bank telecommunication apparatus, the new firmware image from the first bank, when a switchover command is received from the server.

In another aspect of the present invention, there is provided a dual-bank telecommunication apparatus, including: first and second flash banks each configured to store a firmware image; a receiver configured to receive an upgrade command from a server to download a new firmware image; and an upgrade manager configured to delete the firmware image from the first bank in response to the upgrade command, and write the new firmware image into the first bank when the receiver downloads the new firmware image; wherein the upgrade manger loads the new firmware image from the first bank, when the receiver receives a switchover command from the server.

BRIEF DESCRIPTION OF THE DRAWINGS

These and other aspects, features and advantages of the present invention will become apparent from the following description in connection with the accompanying drawings in which:

FIG. 5 shows a sequence diagram of a method of upgrading firmware in CPE.

DETAILED DESCRIPTION OF THE PREFERRED EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be practiced without the specific details present herein.

Figure 1:
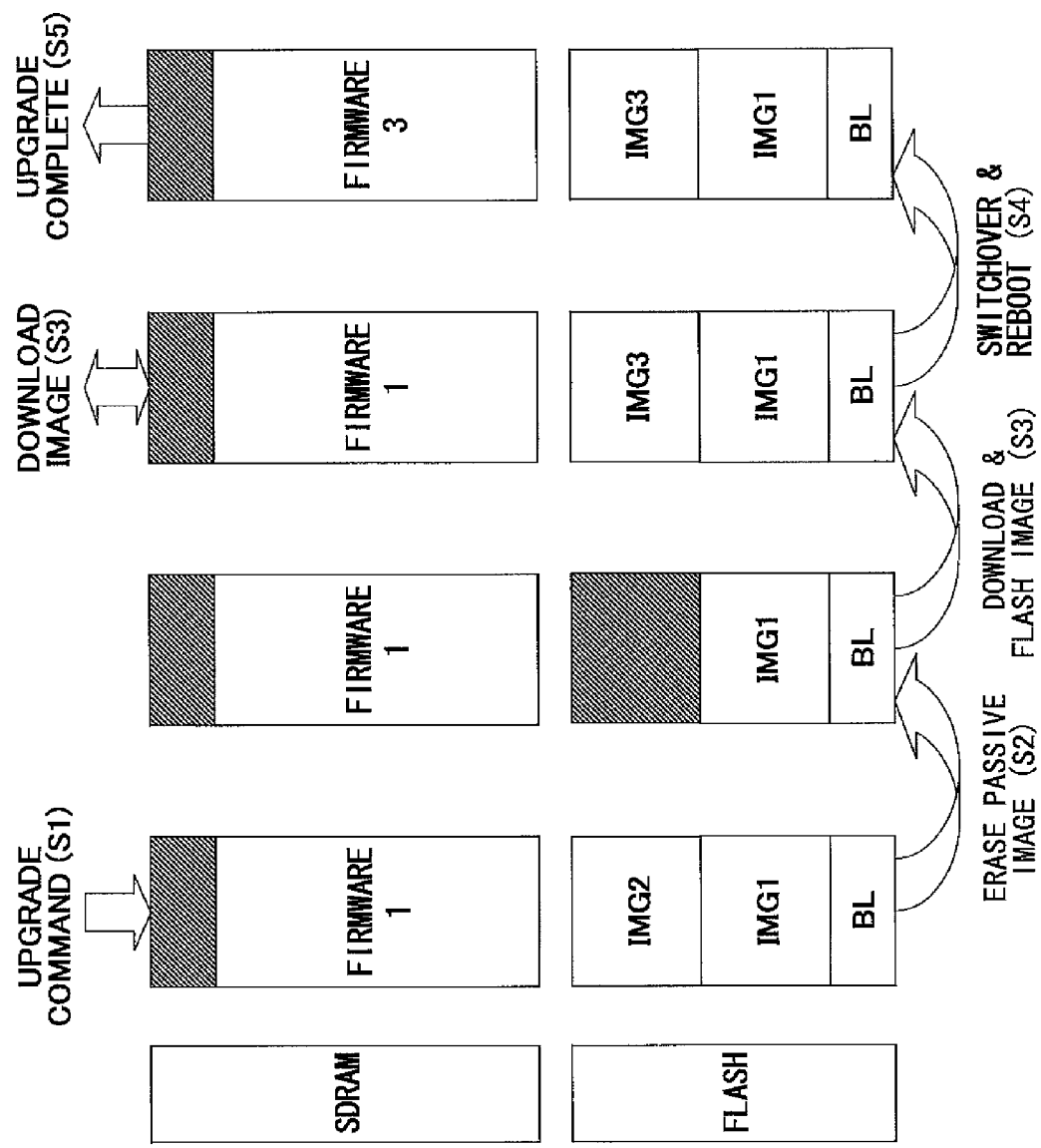
FIG. 1 shows a conceptual diagram of upgrading firmware in CPE.
Figure 2:
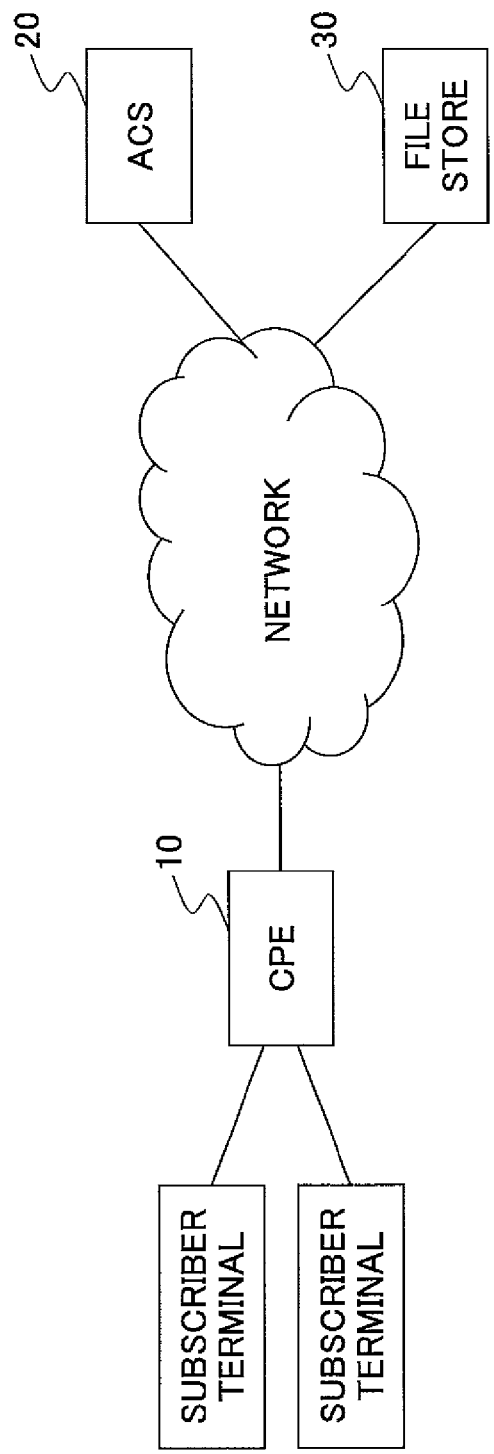
FIG. 2 shows overall system architecture in accordance with an embodiment of the present invention.

FIG. 2 shows overall system architecture in accordance with an embodiment of the present invention. In the embodiment of the present invention, CPE 10, an ACS 20, and a file store 30 are connected via a network.

The CPE 10 is a telecommunication apparatus for connecting subscriber terminals to an external network such as Internet. For example, the CPE 10 may be a gateway apparatus such as a DSL modem or a broadband router. The CPE 10 includes two flash banks (an active bank and a passive bank) each configured to store a firmware image. The CPE loads the firmware image stored in the active bank upon rebooting.

The ACS 20 is a server used to perform an auto-configuration of the CPE 10. The ACS 20 controls the CPE 10 to upgrade the firmware. The ACS 20 may save configuration data of the CPE 10.

The file store 30 stores firmware images including a new firmware image. The file store 30 may be different from the ACS 20 as shown in FIG. 2 or may be the same as the ACS 20.

In the embodiment of the present invention, the ACS 20 invokes a Firmware Image Download RPC with URL (Uniform Resource Locator) indication of the file store 30, when firmware is to be upgraded in the CPE 10. In response to this RPC invoking, the CPE 10 downloads and writes a new firmware image into the passive bank.

After the new firmware image is successfully written into the passive bank, the CPE enters a WaitforSwitchover state of waiting for a switchover command from the ACS 20 and sends a TransferComplete message to the ACS 20 to indicate that the new firmware image is downloaded successfully.

At the ACS 20, configuration data of the CPE 10 may be saved before switchover to the new firmware. The saving of the configuration data may be performed automatically upon receiving the TransferComplete message or manually by input from the operator. The operator may check whether the configuration data are proper for the new firmware. When the backup is completed, the ACS 20 can send a Switchover command to the CPE to make the new firmware active. The ACS 20 may restore the configuration data after the switchover.

According to the embodiment of the present invention, the proper configurations can be kept and applied by the ACS 20 to avoid the CPE 10 functioning abnormally. In addition, the ACS 20 can get the TransferComplete message immediately after flashing. Furthermore, the operator can control the CPE reboot time. Specifically, the operator can check the configuration data and the state of the CPE 10 to determine whether it is suitable for switchover.

Figure 3:
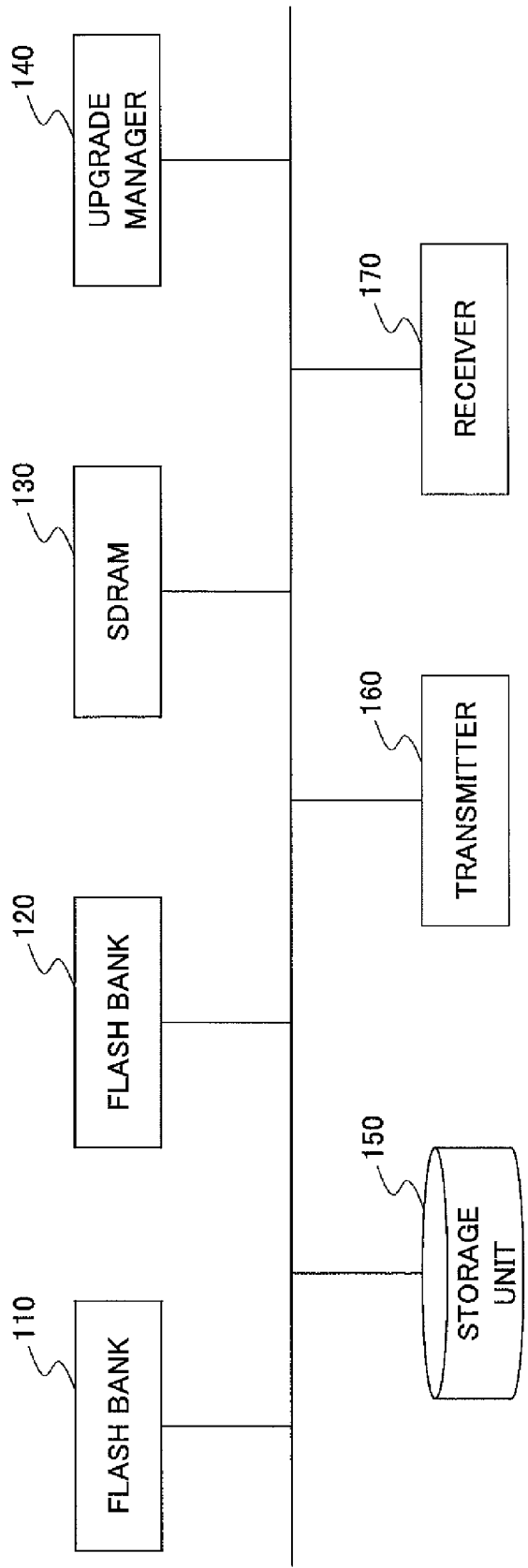
FIG. 3 shows a block diagram of CPE in accordance with an embodiment of the present invention.

FIG. 3 shows a block diagram of CPE 10 in accordance with an embodiment of the present invention.

The CPE 10 includes two flash banks 110 and 120, an SDRAM 130, an upgrade manager 140, a storage unit 150, a transmitter 160, and a receiver 170.

Each of the two flash banks 110 and 120 stores one or more firmware images. One of the two flash banks 110 and 120 is an active bank from which the CPE 10 reboots. Another one is a passive bank. It is assumed that the flash bank 110 is a passive bank and the flash bank 120 is an active bank.

The SDRAM 130 is a memory of the CPE 10. The SDRAM 130 stores firmware loaded from the active flash bank 120. The processor in the CPE 10 runs the firmware from the SDRAM 130.

The upgrade manager 140 controls firmware upgrade in the CPE 10. Specifically, when a Firmware Image Download RPC to download a new firmware image is received from the ACS 20, the upgrade manager 140 deletes the firmware image from the passive flash bank 110, downloads the new firmware image from the file store 30, and writes the new firmware image into the passive flash bank 110. When a switchover command is received from the ACS 20, the upgrade manager 140 updates a partition table in the CPE 10 to accomplish switchover between the active flash bank 120 and the passive flash bank 110. Then, the upgrade manager 140 reboots the CPE 10. After the reboot, the passive flash bank 110 becomes an active one and the active flash bank 120 becomes a passive one. As a result, the new firmware is loaded from the active flash bank 110.

The storage unit 150 stores configuration data of the CPE 10. The configuration data may include network configuration data such as WLAN data or IPT (Internet Protocol Telephony) call waiting data and user data such as game or application share rules.

The transmitter 160 transmits a command, a message, or data to the ACS 20. In the embodiment of the present invention, the transmitter 160 transmits a TransferComplete message to the ACS 20 to indicate that the new firmware image is downloaded successfully. The transmitter 160 may also transmit configuration data stored in the storage unit 150 to the ACS 20 for backup.

The receiver 170 receives a command, a message, or data from the ACS 20. The receiver 170 also receives a firmware image from the file store 30. In the embodiment of the present invention, the receiver 170 receives a Firmware Image Download RPC from the ACS 20 to download a new firmware image from the file store 30. The receiver 170 also receives a switchover command from the ACS 20 to make the new firmware active. The receiver 170 may also receive configuration data stored in the ACS 20 for restoration.

Figure 4:
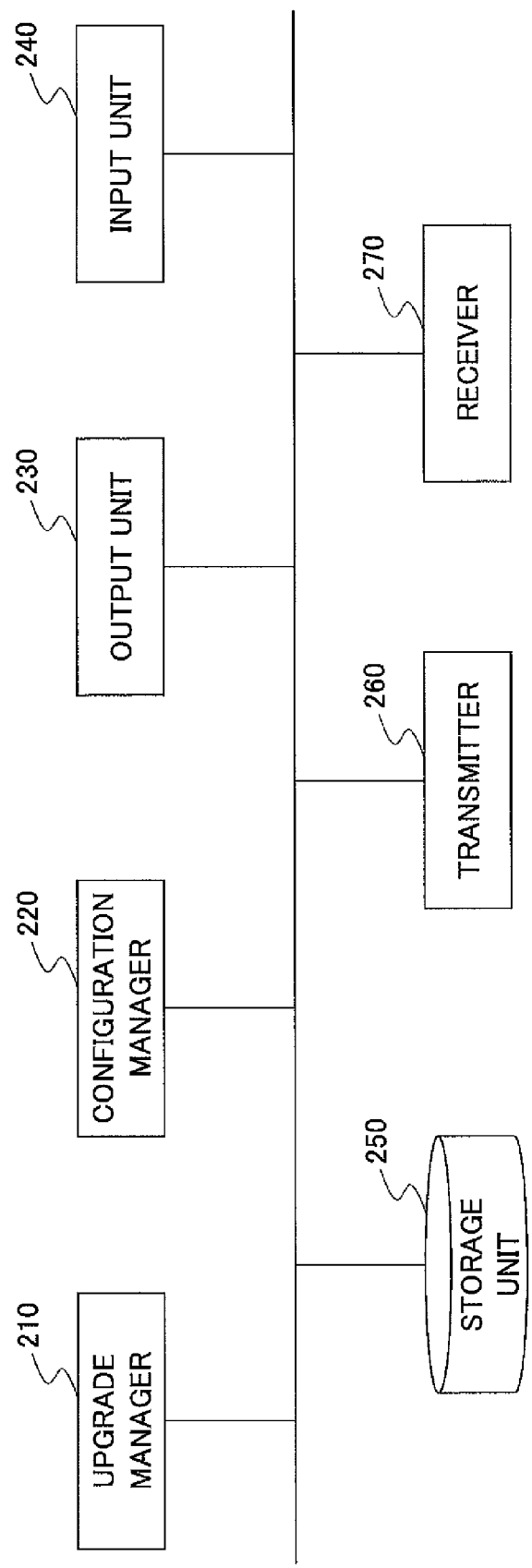
FIG. 4 shows a block diagram of an ACS in accordance with an embodiment of the present invention.

FIG. 4 shows a block diagram of an ACS 20 in accordance with an embodiment of the present invention.

The ACS 20 includes an upgrade manager 210, a configuration manager 220, an output unit 230, an input unit 240, a storage unit 250, a transmitter 260, and a receiver 270.

The upgrade manager 210 controls firmware upgrade in the CPE 10. Specifically, the upgrade manager 210 invokes a Firmware Image Download RPC with URL indication of the file store 30 to initiate downloading a new firmware image in the CPE 10. The upgrade manager 210 also invokes a switchover command to the CPE 10 to trigger switchover between the active bank and the passive bank in the CPE 10. The switchover command may be input by the operator from the input unit 240.

The configuration manager 220 saves configuration data of the CPE 10 in the storage unit 250 before the switchover and restores the configuration data from the storage unit 250 after the switchover. The configuration data may be network data such as WLAN data and IPT call waiting data or user data such as game and application share rules. The configuration manager 220 may output the configuration data to the output unit 230 for the operator to check whether the configuration data are proper for the new firmware.

The transmitter 260 transmits a command, a message, or data to the CPE 10. In the embodiment of the present invention, the transmitter 260 transmits a Firmware Image Download RPC to the CPE 10 to invoke firmware download. The transmitter 260 also transmits a switchover command to trigger switchover between the active bank and the passive bank. The transmitter 260 may also transmit configuration data stored in the storage unit 250 for restoration.

The receiver 270 receives a command, a message, or data from the CPE 10. In the embodiment of the present invention, the receiver 270 receives a TransferComplete message from the CPE 10. The receiver 270 also receives configuration data from the CPE 10 for backup.

FIG. 5 shows a sequence diagram of a method of upgrading firmware in CPE 10.

First, when new firmware is released, the ACS 10 invokes a Firmware Image Download RPC with URL indication of the file store 30. For example, at step S101, the ACS 20 invokes an HTTP GET method with URL indication of the CPE 10. At step S103, the CPE 10 issues an HTTP POST method to request a connection to the ACS 20. At step S105, the ACS 20 transmits an upgrade command to download a new firmware image with URL indication of the file store 30.

In response to the RPC invoking, at step S107, the CPE 10 triggers HTTP GET method to download the new firmware image from the file store 30. Then, at step S109, the new firmware image is transferred from the file store 30 to the CPE 10 and the transferred image is written into the passive bank in the CPE 10.

In order for the CPE 10 to enter the WaitforSwitchover state, a parameter "Upgrade.ManualSwitchover" may be defined. When this parameter is equal to zero, switchover is performed automatically after flashing. When this parameter is equal to one, switchover needs an explicit trigger from the ACS 20. In this embodiment, it is assumed that this parameter is equal to one.

After the new firmware image is successfully written into the passive bank, the CPE 10 enters the WaitforSwitchover state and transmits a TransferComplete message to the ACS 20. For example, at step S111, the CPE 10 invokes an HTTP POST method to inform the ACS 20 of the completion of the transfer, and at step S113, the ACS 20 transmits an HTTP response to the CPE 10. At step S115, the CPE 10 issues an HTTP POST method to indicate that the new firmware image is downloaded successfully, and at step S117, the ACS 20 transmits an HTTP response to the CPE 10. According to this procedure, the ACS 20 can get the TransferComplete message immediately after flashing.

Then, the ACS 20 can run the policy that saves the configuration data of the CPE 10 for backup. The configuration data is stored in a specific section in the storage unit in the ACS 20. Since the CPE 10 is in the WaitforSwitchover state, the operator can check the configuration data to avoid the CPE 10 functioning abnormally.

Next, the ACS 20 triggers switchover between the active bank and the passive bank in the CPE 10. For example, at step S119, the ACS 20 invokes an HTTP GET method with URL indication of the CPE 10. At step S121, the CPE 10 issues an HTTP POST method to request a connection to the ACS 20. At step S123, the ACS 20 transmits a switchover command by setting a particular parameter "InternetGatewayDevice.DeviceConfig.X_000E50_SwitchtoPassiveBank=True". At step 125, with automatic reboot, the passive bank becomes an active one and the active bank becomes a passive one. As a result, the CPE 10 loads the new firmware image from the active bank and issues an HTTP POST method to inform the ACS 20 of the completion of the reboot.

The operator may restore the configuration data from the storage unit in the ACS 20. If needed, the configuration data may be modified in accordance with new settings defined in the new firmware.

According to the embodiment of the present invention, the proper configurations can be kept locally in the ACS 20 to check whether the CPE 10 functions properly. In addition, the ACS 20 can get the TransferComplete message immediately after flashing so that the ACS 20 can quickly control the reboot time.

The embodiment for reducing the risk of causing the CPE to work abnormally upon firmware upgrade is described with reference to the CWMP developed in Broadband Forum. In addition, it can be appreciated by a person skilled in the art that the invention can be applied to any other system which upgrades firmware in a dual-bank telecommunication apparatus.

For convenience of explanation, the CPE and the ACS according to the embodiment of the present invention have been described with reference to functional block diagrams, and the CPE and the ACS may be implemented in hardware, software, or in combinations thereof.

It is to be understood that numerous modifications may be made to the illustrative embodiments and that other arrangements may be devised without departing from the spirit and scope of the present invention as defined by the appended claims.

The invention claimed is:

1. A method of upgrading firmware in a dual-bank telecommunication apparatus which includes first and second flash banks each configured to store a firmware image, comprising:
    receiving, by the dual-bank telecommunication apparatus, an upgrade command from an external server to download a new firmware image;
    deleting, by the dual-bank telecommunication apparatus, the firmware image from the first bank in response to the upgrade command, and downloading and writing the new firmware image into the first bank; and
    loading, by the dual-bank telecommunication apparatus, the new firmware image from the first bank, when a switchover command is received from the external server,
    wherein the first flash bank is a passive bank and the second flash bank is an active bank before the switchover command is received from the external server and the dual-bank telecommunication apparatus is rebooted.

2. The method as claimed in claim 1, further comprising: entering, by the dual-bank telecommunication apparatus, a state of waiting for the switchover command, when the new firmware image is written into the first bank; and transmitting, by the dual-bank telecommunication apparatus, a transfer complete message to the external server to indicate that the new firmware image is downloaded successfully.

3. The method as claimed in claim 2, further comprising: saving, by the external server, configuration data of the dual-bank telecommunication apparatus in response to the transfer complete message; and restoring the configuration data from the external server to the dual-bank telecommunication apparatus.

4. The method as claimed in claim 1, wherein: the step of receiving the upgrade command comprises receiving the upgrade command with URL (Uniform Resource Locator) indication of an apparatus in which the new firmware image is stored.

5. A dual-bank telecommunication apparatus, comprising:
    first and second flash banks each configured to store a firmware image;
    a receiver configured to receive an upgrade command from an external server to download a new firmware image; and
    an upgrade manager configured to delete the firmware image from the first bank in response to the upgrade command, and write the new firmware image into the first bank when the receiver downloads the new firmware image;
    wherein the first flash bank is a passive bank and the second flash bank is an active bank before the switchover command is received from the external server and the dual-bank telecommunication apparatus is rebooted, wherein the upgrade manger loads the new firmware image from the first bank, when the receiver receives a switchover command from the external server.

6. The dual-bank telecommunication apparatus as claimed in claim 5, wherein: the upgrade manager enters a state of waiting for the switchover command, when the new firmware image is written into the first bank and transmits a transfer complete message to the external server to indicate that the new firmware image is downloaded successfully.

7. The dual-bank telecommunication apparatus as claimed in claim 5, wherein: the receiver receives the upgrade command with URL (Uniform Resource Locator) indication of an apparatus in which the new firmware image is stored.

* * * * *